(12) United States Patent
Endo

(10) Patent No.: US 10,965,209 B2
(45) Date of Patent: Mar. 30, 2021

(54) POWER SUPPLY CONTROLLER WITH DELAY ADJUSTMENT

(71) Applicant: FUJI ELECTRIC CO., LTD., Kanagawa (JP)

(72) Inventor: Yuta Endo, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 16/663,304

(22) Filed: Oct. 24, 2019

(65) Prior Publication Data
US 2020/0144906 A1 May 7, 2020

(30) Foreign Application Priority Data

Nov. 5, 2018 (JP) .............................. JP2018-208270

(51) Int. Cl.
*H02M 1/42* (2007.01)
*H02M 3/335* (2006.01)
*H02M 7/219* (2006.01)

(52) U.S. Cl.
CPC ..... *H02M 1/4225* (2013.01); *H02M 3/33507* (2013.01); *H02M 7/219* (2013.01)

(58) Field of Classification Search
CPC ............. H02M 3/335; H02M 3/33507; H02M 3/33569; H02M 3/156; H02M 3/158; H02M 3/1588; H02M 3/4258; H02M 3/4225; H02M 1/42
See application file for complete search history.

(56) References Cited

U.S. PATENT DOCUMENTS

| 5,517,399 | A | * | 5/1996 | Yamauchi | ............ | H02M 3/1563 363/89 |
| 2004/0008016 | A1 | * | 1/2004 | Sutardja | .................. | H02M 1/38 323/283 |
| 2006/0061337 | A1 | | 3/2006 | Kim | | |
| 2010/0270949 | A1 | * | 10/2010 | Onishi | ............... | H05B 41/2856 315/307 |
| 2013/0307497 | A1 | * | 11/2013 | Chen | ................... | H02M 1/4225 323/235 |
| 2014/0085949 | A1 | | 3/2014 | Sugawara | | |

(Continued)

FOREIGN PATENT DOCUMENTS

| JP | 2008199896 A | 8/2008 |
| JP | 2014082924 A | 5/2014 |

(Continued)

*Primary Examiner* — Thienvu V Tran
*Assistant Examiner* — Nusrat Quddus

(57) ABSTRACT

When an input voltage changes due to switching of an AC power supply, as a result of a change in a timing at which an inductor current becomes zero and an element voltage of a switching element becomes local minimum, a switching loss increases. Provided is a power supply controller that includes a switch control unit that controls an on/off of a switching element of a boost chopper; a detection unit that detects that a first value based on an inductor voltage of an inductor of the boost chopper is less than a threshold: and a delay adjustment unit that adjusts a delay time from when the detection unit detects that the first value is less than the threshold until when the switch control unit turns on the switching element according to a second value based on the inductor voltage.

17 Claims, 9 Drawing Sheets

(56) References Cited

U.S. PATENT DOCUMENTS

| | | | |
|---|---|---|---|
| 2014/0185334 A1 | 7/2014 | Chen | |
| 2015/0035446 A1* | 2/2015 | Yamahara | H05B 45/3725 |
| | | | 315/210 |
| 2017/0266090 A1* | 9/2017 | Wheeler | A61K 8/9789 |
| 2017/0366090 A1 | 12/2017 | Sugawara | |

FOREIGN PATENT DOCUMENTS

| | | |
|---|---|---|
| JP | 2014131455 A | 7/2014 |
| JP | 2017225260 A | 12/2017 |

* cited by examiner

POWER SUPPLY CONTROLLER WITH DELAY ADJUSTMENT

The contents of the following Japanese patent application are incorporated herein by reference:
2018-208270 filed in JP on Nov. 5, 2018.

BACKGROUND

1. Technical Field

The present invention relates to a power supply controller.

2. Related Art

Conventionally, a boost chopper that boosts an AC voltage rectified at a full-wave rectifying circuit sets in advance as delay time, time from a particular reference timing to a timing at which an inductor current becomes zero and an element voltage of a switching element becomes local minimum, and turns on the switching element after the delay time from a reference timing, and accordingly a switching loss is reduced (for example, see Patent Documents 1 and 2).
Patent Document 1: Japanese Patent Application Publication No. 2014-82924
Patent Document 2: Japanese Patent Application Publication No. 2017-225260

SUMMARY

However, if an input voltage changes due to switching of an AC power supply, as a result of a change in a timing at which an element voltage of a switching element becomes local minimum, a switching loss increase.

SUMMARY

To solve the above problem, in a first aspect of the present invention, a power supply controller is provided. The power supply controller may include a switch control unit that controls an on/off of a switching element of a boost chopper. The power supply controller may include a detection unit that detects that a first value based on an inductor voltage of an inductor of the boost chopper is less than a threshold. The power supply controller may include a delay adjustment unit that adjusts a delay time from when the detection unit detects that the first value is less than the threshold until when the switch control unit turns on the switching element according to a second value based on the inductor voltage.

The delay adjustment unit may determine whether the second value during an ON period of the switching element is a reference value or more. The delay adjustment unit may set the delay time smaller in a case of determining that the second value is the reference value or more than in a case that the second value is less than the reference value.

The switch control unit may turn on the switching element in response to that the number of times when the first value changes from the threshold or more to less than the threshold reaches a predetermined number of times. The delay adjustment unit may adjust the delay time from when the number of times when the first value changes from the threshold or more to less than the threshold reaches the predetermined number of times until when the switch control unit turns on the switching element.

The switch control unit may include a turn-on timer unit that turns on the switching element after a predetermined turn-on timer time. The delay adjustment unit may further adjust the turn-on timer time based on the second value.

The boost chopper may include a boost transformer having a main winding functioning as the inductor and an auxiliary winding. The detection unit may use an auxiliary winding voltage as the first value.

The boost chopper may include a transformer having a main winding functioning as the inductor and an auxiliary winding. The delay adjustment unit may use a current according to the auxiliary winding voltage as a second value.

The delay adjustment unit may switch which of delay time setting values according to a plurality of types of rated voltages is used as the delay time based on the second value during an ON period of the switching element.

The delay adjustment unit may adjust the delay time according to a change in the second value in association with a change in an AC input voltage from a power source that supplies power to the boost chopper.

The delay adjustment unit may adjust the delay time according to the second value based on the inductor voltage during an off period of the switching element.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described with reference to embodiments of the invention. However, the following embodiments should not to be construed as limiting the claimed invention. Also, all the combinations of the features described in the embodiment(s) are not necessarily essential for means provided by aspects of the invention.

1. Configuration of Power Supply Device

Figure 1:
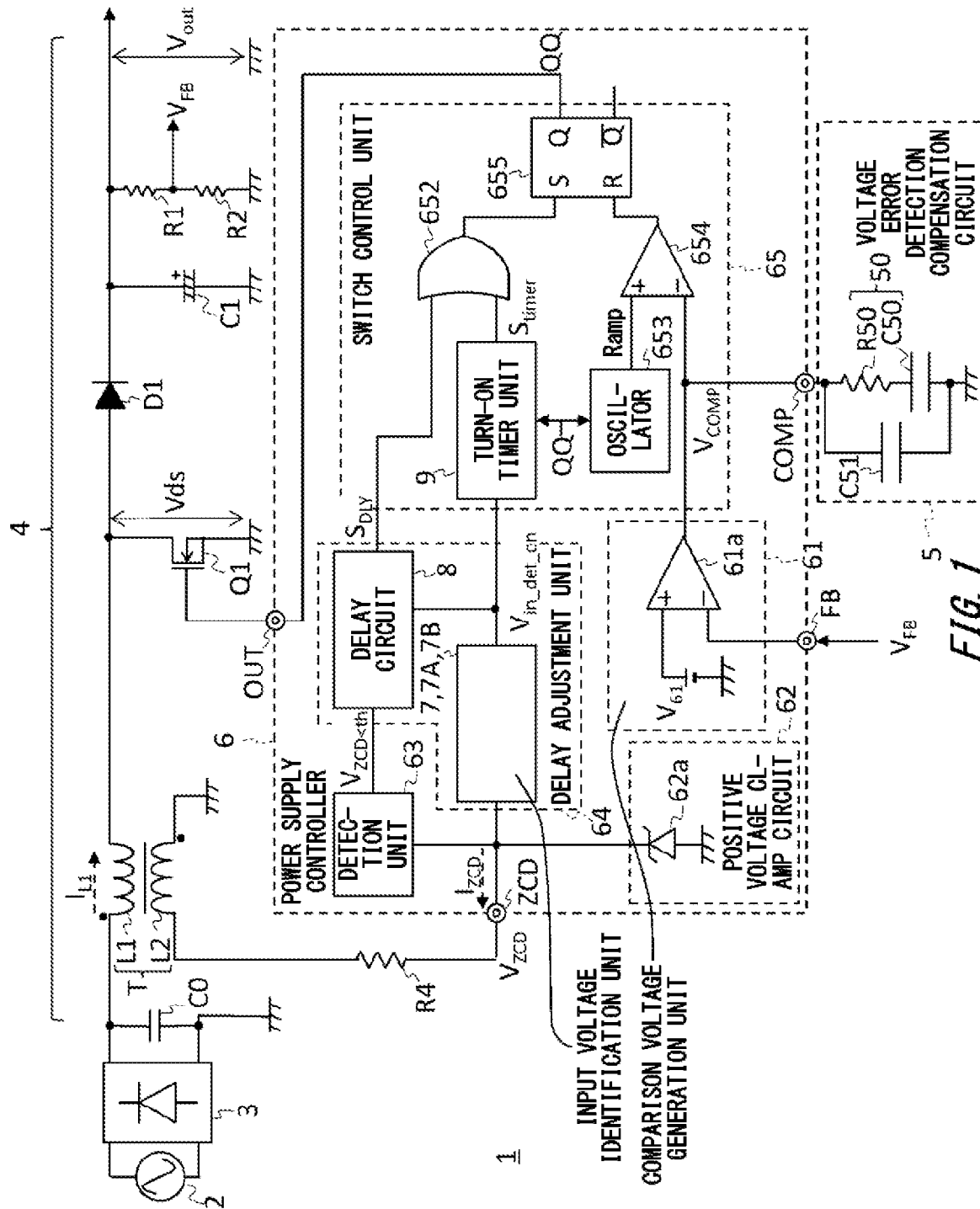
FIG. 1 illustrates a power supply device 1 according to the present embodiment.

FIG. 1 illustrates a power supply device 1 according to the present embodiment. Dashed lines with arrows in FIG. 1 indicate currents.

The power supply device 1 outputs a DC output voltage $V_{out}$ (as an example, 400 V) and is connected to a load which is about 250 W for example. The power supply device 1 includes an AC power supply 2, a full-wave rectifying circuit 3 that rectifies full waves of an AC input voltage from the AC power supply 2, and a boost chopper 4 that boosts a DC output voltage from the full-wave rectifying circuit 3.

[1-1. Boost Chopper 4]

The boost chopper 4 is connected between a positive output side of the full-wave rectifying circuit 3 and a ground, and in the present embodiment, also functions as a power factor corrector for example. The boost chopper 4 includes a smoothing capacitor C0 connected in parallel to the full-wave rectifying circuit 3, a transformer T and a diode D1 connected in series to the positive output side of the full-wave rectifying circuit 3, a boost switching element Q1 for boosting, the output capacitor C1 connected between a cathode side of the diode D1 and a ground, voltage dividing resistors R1 and R2 connected in parallel to the output capacitor C1 for detecting the output voltage $V_{out}$, a sense resistor R4, a voltage error detection compensation circuit 5, and a power supply controller 6.

The smoothing capacitor C0 smoothens a current flowing toward the positive output side of the full-wave rectifying circuit 3. The transformer T includes a main winding functioning as an inductor L1 provided at a positive output side of the full-wave rectifying circuit 3 and an auxiliary winding L2. The inductor L1 smoothens a current flowing in the positive output side of the full-wave rectifying circuit 3 and also boosts the DC output voltage of the full-wave rectifying circuit 3 according to an operation in the boost chopper 4 by using an induced voltage. An inductor current $I_{L1}$ flowing in a primary side inductor L1 may be a harmonic pulsating current of 10 kHz to 1000 kHz as an example. A polarity of the auxiliary winding L2 is set to a reverse polarity of the inductor L1. Regarding the number of turns of the main winding L1 and auxiliary winding L2 as Np and Ns respectively, if a voltage is applied across both ends of the main winding L1, to both ends of the auxiliary winding L2, applied is a voltage obtained by multiplying the voltage by Ns/Np. The auxiliary winding L2 has a first end that is grounded and a second end connected to the sense resistor R4. In the present embodiment, as an example, a voltage applied to both ends of the sense resistor R4 is used as an auxiliary winding voltage $V_{ZCD}$. Note that as the auxiliary winding voltage $V_{ZCD}$, a voltage applied to both ends of an auxiliary winding may be used, or as in the present embodiment, a voltage applied to both ends of a detection resistor connected to the auxiliary winding that is an indirect voltage may be used. A negative voltage is applied to the second end of the auxiliary winding L2 when the switching element Q1 is on, and therefore, a current flowing in the sense resistor R4, that is a current $I_{ZCD}$ flowing in a zero crossing detection terminal ZCD described later flows toward the second end of the auxiliary winding L2 with a low potential although details will be described later.

The diode D1 functions as a reverse current prevention diode. The switching element Q1 is an N-channel MOSFET for example. Alternatively, the switching element Q1 may be another MOSFET, an IGBT or the like. There is a connection point between the inductor L1 and an anode side of the diode D1, and the switching element Q1 has a drain-source electrically connected between the connection point and a ground, and has a gate driven by a drive signal from the power supply controller 6.

As an example, the switching element Q1 is driven by a PWM. The output capacitor C1 removes a high frequency component resulting from a switching operation from a voltage output from the power supply device 1. The voltage dividing resistors R1 and R2 are connected in series with each other.

[1-1-1. Voltage Error Detection Compensation Circuit 5]

The voltage error detection compensation circuit 5 is used to remove a ripple component from an error signal $V_{COMP}$ described later and is connected between the power supply controller 6 and a ground. The voltage error detection compensation circuit 5 includes capacitors C51 and an RC phase compensation circuit 50 connected in parallel. The RC phase compensation circuit 50 includes a resistor R50 and a capacitor C50 connected in series. The capacitor C51 and the capacitor C50 generate the error signal $V_{COMP}$ as a voltage to be compared with an oscillation wave output from an oscillator 653 described later according to charge amounts.

[1-1-2. Power Supply Controller 6]

The power supply controller 6 may be an IC for example, and includes a feedback terminal FB, an output terminal OUT, a voltage error detection compensation terminal COMP, and a zero crossing detection terminal ZCD. The power supply controller 6 may further include other terminals (as an example, power supply terminal, ground terminal or the like). The feedback terminal FB is connected to a connection point between the voltage dividing resistors R1 and R2 and receives a feedback voltage $V_{FB}$ obtained by dividing the output voltage $V_{out}$ of the power supply device 1. The output terminal OUT is connected to a gate of the boost switching element Q1 for boosting and outputs a drive signal QQ that is pulse width modulated to drive the switching element Q1. The voltage error detection compensation circuit 5 is connected to the voltage error detection compensation terminal COMP. The zero crossing detection terminal ZCD is connected to the second end of the sense resistor R4 (end of sense resistor R4 opposite to auxiliary winding L2) and receives the auxiliary winding voltage $V_{ZCD}$ generated by the auxiliary winding current flowing in the sense resistor R4.

The power supply controller 6 causes the boost chopper 4 to perform a power factor improvement of a critical control method, and turns on the switching element Q1 at a timing at which ideally a current flowing in the boost chopper 4 becomes zero and the source-drain voltage Vds of the switching element Q1 becomes local minimum. The power supply controller 6 includes a comparison voltage generation unit 61, a positive voltage clamp circuit 62, a detection unit 63, a delay adjustment unit 64, and a switch control unit 65.

[1-1-2(1). Comparison Voltage Generation Unit 61]

The comparison voltage generation unit 61 charges or discharges comparison capacitors C50 and C51 according to a DC output voltage $V_{out}$ output from the boost chopper 4. As an example, in the present embodiment, the comparison voltage generation unit 61 uses the feedback voltage $V_{FB}$ as the DC output voltage $V_{out}$. The comparison voltage generation unit 61 includes an error amplifier 61a. The error amplifier 61a has an inverting input side supplied with the feedback voltage $V_{FB}$ and a non-inverting input side supplied with a reference voltage $V_{61}$ according to a target output voltage. The error amplifier 61a may be a transconductance amplifier. The error amplifier 61a may generate a current according to a difference voltage between the feedback voltage $V_{FB}$ and the reference voltage $V_{61}$ and generate the error signal $V_{COMP}$ by charging or discharging the capacitors C50 and C51 of the voltage error detection compensation circuit 5 connected to the voltage error detection compensation terminal COMP with a charge/discharge current. The ripple component included in a current output from the error amplifier 61a is smoothened by generating the error signal $V_{COMP}$ by using the voltage error detection compensation circuit 5 and the error signal $V_{COMP}$ becomes a DC voltage in a steady state. The error signal $V_{COMP}$ is supplied to the switch control unit 65 or the like.

[1-1-2 (2). Positive Voltage Clamp Circuit 62]

The positive voltage clamp circuit 62 clamps a voltage applied to the zero crossing detection terminal ZCD to a predetermined positive clamp voltage or lower. For example, the positive voltage clamp circuit 62 may include a Zener diode 62a connected between the zero crossing detection terminal ZCD and a ground. A cathode of the Zener diode 62a may be provided to the zero crossing detection terminal ZCD side. The Zener diode 62a clamps a voltage applied to the zero crossing detection terminal ZCD to a clamp voltage by not flowing a current when the auxiliary winding voltage $V_{ZCD}$ is less than the clamp voltage or flowing a current when the auxiliary winding voltage $V_{ZCD}$ is the clamp voltage or higher. This prevents a destruction of internal elements of the power supply controller 6 when the auxiliary winding voltage $V_{ZCD}$ becomes high.

[1-1-2 (3). Detection Unit 63]

The detection unit 63 detects that a first value based on an inductor voltage becomes less than a threshold. Specifically, in response to that the switching element Q1 is turned off, an inductor voltage of a main winding decreases. Therefore, an auxiliary winding voltage $V_{ZCD}$ of an auxiliary winding having the same core in the transformer T also decreases. The detection unit 63 may use the auxiliary winding voltage $V_{ZCD}$ as the first value. That is, the detection unit 63 may detect that the auxiliary winding voltage $V_{ZCD}$ as the first value becomes less than the threshold. The threshold of the auxiliary winding voltage $V_{ZCD}$ may be the auxiliary winding voltage $V_{ZCD}$ (also referred to as zero crossing reference voltage $V_{th\_zcd}$) at reference timing for determining timing for turning on the switching element Q1 and may be 1V as an example. The detection unit 63 may include a comparator (not illustrated) that detects that the auxiliary winding voltage $V_{ZCD}$ becomes less than the zero crossing reference voltage $V_{th\_zcd}$. A timing ($t_{VZCD=th}$) at which the auxiliary winding voltage $V_{ZCD}$ becomes the zero crossing reference voltage $V_{th\_zcd}$ may be before a timing ($t_{Vds=min}$) at which an inductor current $I_{L1}$ becomes zero and the source-drain voltage Vds of the switching element Q1 becomes local minimum and an interval from the timing ($t_{VZCD=th}$) to the timing ($t_{Vds=min}$) may vary depending on an input voltage.

The detection unit 63 may further include a counter that counts the number of times that the auxiliary winding voltage $V_{ZCD}$ becomes less than the zero crossing reference voltage $V_{th\_zcd}$ and output a detection signal $V_{ZCD<th}$ that becomes high level in response to that a count value has reached a predetermined reference number (as an example, twice). Although details are described later, if the detection signal $V_{ZCD<th}$ becomes high level, the switch control unit 65 causes the switching element Q1 to be turned on. Accordingly, the switching element Q1 is turned on in response to that the number of times that the auxiliary winding voltage $V_{ZCD}$ becomes less than the zero crossing reference voltage $V_{th\_zcd}$ has reached the reference number. A control of turning on the switching element Q1 for each of timings of the reference number at which the source-drain voltage Vds of the switching element Q1 becomes a bottom value by skipping at least one of the timings, that is a bottom skip control is performed unlike when the switching element Q1 is turned on each time the auxiliary winding voltage $V_{ZCD}$ becomes less than zero crossing reference voltage $V_{th\_zcd}$. The detection unit 63 may supply the detection signal $V_{ZCD<th}$ to the delay adjustment unit 64.

[1-1-2 (4). Delay Adjustment Unit 64]

The delay adjustment unit 64 adjusts a delay time from when it is detected that a first value based on an inductor voltage (in the present embodiment, as an example, auxiliary winding voltage $V_{ZCD}$) becomes less than a threshold (in the present embodiment, as an example, zero crossing reference voltage $V_{th\_zcd}$) until when the switch control unit 65 turns on the switching element Q1. The auxiliary winding voltage $V_{ZCD}$ may become less than zero crossing reference voltage $V_{th\_zcd}$ during an OFF period of the switching element Q1. The delay adjustment unit 64 may adjust a delay time according to a second value based on the inductor voltage, and as an example, may adjust the delay time according to a second value during an ON period of the switching element Q1. The delay adjustment unit 64 may use a current according to the auxiliary winding voltage $V_{ZCD}$ as the second value and in the present embodiment, as an example, use the current $I_{ZCD}$ flowing in the zero crossing detection terminal ZCD as the second value. The delay adjustment unit 64 may perform an adjustment such that a delay time matches an elapsed time from a timing ($t_{VZCD=th}$) at which the detection signal $V_{ZCD<th}$ becomes high level to a timing ($t_{Vds=min}$) at which the inductor current $I_{L1}$ becomes zero and the source-drain voltage Vds becomes local minimum.

As described above, in the present embodiment, the detection unit 63 detects that the auxiliary winding voltage $V_{ZCD}$ becomes less than the zero crossing reference voltage $V_{th\_zcd}$. The detection signal $V_{ZCD<th}$ becomes high level when a count value of the number of times that the auxiliary winding voltage $V_{ZCD}$ becomes less than the zero crossing reference voltage $V_{th\_zcd}$ reaches a reference number of a bottom skip control. Therefore, a delay time from a timing at which the number of times that the auxiliary winding voltage $V_{ZCD}$ becomes less than the zero crossing reference voltage $V_{th\_zcd}$ reaches a reference number is adjusted by adjusting a delay time from a timing ($tV_{ZCD=th}$) at which the detection signal $V_{ZCD<th}$ becomes high level. The delay adjustment unit 64 includes an input voltage identification unit 7 and a delay circuit 8.

The input voltage identification unit 7 is connected between the zero crossing detection terminal ZCD and the switch control unit 65. The input voltage identification unit 7 identifies which of a plurality of types of rated voltage is an AC input voltage according to the current $I_{ZCD}$ flowing in the zero crossing detection terminal ZCD. The input voltage identification unit 7 may supply a voltage identification signal $Vi_{n\_det\_on}$ indicating an identification result to a delay circuit 8 and the switch control unit 65.

The delay circuit 8 is connected between the detection unit 63 and the switch control unit 65. The delay circuit 8 outputs a signal $S_{DLY}$ that becomes high level after a preset delay time from a time when the detection signal $V_{ZCD<th}$ from the detection unit 63 becomes high level. The delay circuit 8 may adjust a delay time according to the voltage identification signal $V_{in\_det\_on}$. The delay circuit 8 may supply an output signal to the switch control unit 65.

[1-1-2 (5). Switch Control Unit 65]

The switch control unit 65 controls on/off of the switching element Q1 of the boost chopper 4. The switch control unit 65 includes a turn-on timer unit 9, an OR gate 652, an oscillator 653, a pulse width modulation comparator 654, and an RS flip-flop 655.

The turn-on timer unit 9 outputs a signal $S_{timer}$ that becomes high level in a case that the switching element Q1 does not change from an off state to an on state within a preset time. The turn-on timer unit 9 supplies the signal $S_{timer}$ to the OR gate 652.

The OR gate 652 supplies, to the RS flip-flop 655, a signal obtained by ORing the signal $S_{DLY}$ from the delay circuit 8 and the signal $S_{timer}$ from the turn-on timer unit 9.

The oscillator 653 generates oscillation waves. In the present embodiment, as an example, the oscillator 653 generates a triangular (as an example, saw tooth wave shape) ramp wave Ramp as an oscillation wave. The oscillator 653 supplies a ramp wave Ramp to the pulse width modulation comparator 654. The oscillator 653 may start generation of the ramp wave Ramp in the case of receiving a trigger signal (in the present embodiment, as an example, in a case that high level output signal QQ is output from RS flip-flop 655 described later) and stop and reset generation of the ramp wave Ramp in a case of not receiving the trigger signal.

The pulse width modulation comparator 654 outputs a pulse width modulation signal for modulating a pulse width of a drive signal of the switching element Q1. The pulse width modulation comparator 654 has a non-inverting input terminal receiving the ramp wave Ramp from the oscillator 653 and an inverting input terminal receiving an error signal $V_{COMP}$ generated by an error amplifier 61a and a voltage error detection compensation circuit 5. Accordingly, an output signal of the pulse width modulation comparator 654 becomes low level in a case that an instantaneous value of an oscillation wave is less than the error signal $V_{COMP}$ and becomes high level in a case that the instantaneous value of the oscillation wave is the error signal $V_{COMP}$ or more. The pulse width modulation comparator 654 outputs an output signal to the RS flip-flop 655.

The RS flip-flop 655 has a set terminal S receiving the output signal of the OR gate 652 and a reset terminal R receiving the output signal of the pulse width modulation comparator 654. The RS flip-flop 655 outputs a high level output signal QQ in a set state and outputs a low level output signal QQ in a reset state. The RS flip-flop 655 supplies an output signal QQ from its output terminal Q to the turn-on timer unit 9 and the switching element Q1. An unillustrated driver may be interposed between the RS flip-flop 655 and the switching element Q1.

The above described power supply controller 6 adjusts, according to the current $I_{ZCD}$, a delay time from when it is detected that the auxiliary winding voltage $V_{ZCD}$ becomes less than zero crossing reference voltage $V_{th\_zcd}$ until when the switching element Q1 is turned on. Therefore, even if an input voltage changes, the switching element Q1 can be turned on at a timing (tVds=min) at which the inductor current $I_{L1}$ becomes zero and the source-drain voltage Vds of the switching element Q1 becomes local minimum. This allows to reduce a switching loss and improve energy efficiency while preventing distortion of the input current.

The switching element Q1 is turned on after a count value of number of times that the auxiliary winding voltage $V_{ZCD}$ changes from the zero crossing reference voltage $V_{th\_zcd}$ or more to less than zero crossing reference voltage $V_{th\_zcd}$ reaches a reference number, and therefore, so-called bottom skip control is performed. This allows reducing a switching loss by reducing a switching frequency to increase energy efficiency. A delay time from when a count value reaches a reference number until when the switching element Q1 is turned on is adjusted, and thus, even if an input voltage changes when the bottom skip control is performed, the switching element Q1 can be turned on at a timing ($t_{Vds=min}$) at which the inductor current $I_{L1}$ becomes zero and the source-drain voltage Vds of the switching element Q1 becomes local minimum.

The power supply controller 6 can be simplified compared to when a detection terminal of an input voltage is provided to the power supply controller 6 because the auxiliary winding voltage $V_{ZCD}$ detected by the sense resistor R4 that detects the auxiliary winding current flowing in the auxiliary winding L2 is used as a first value based on an inductor voltage.

2. Operation Waveform

Figure 2:
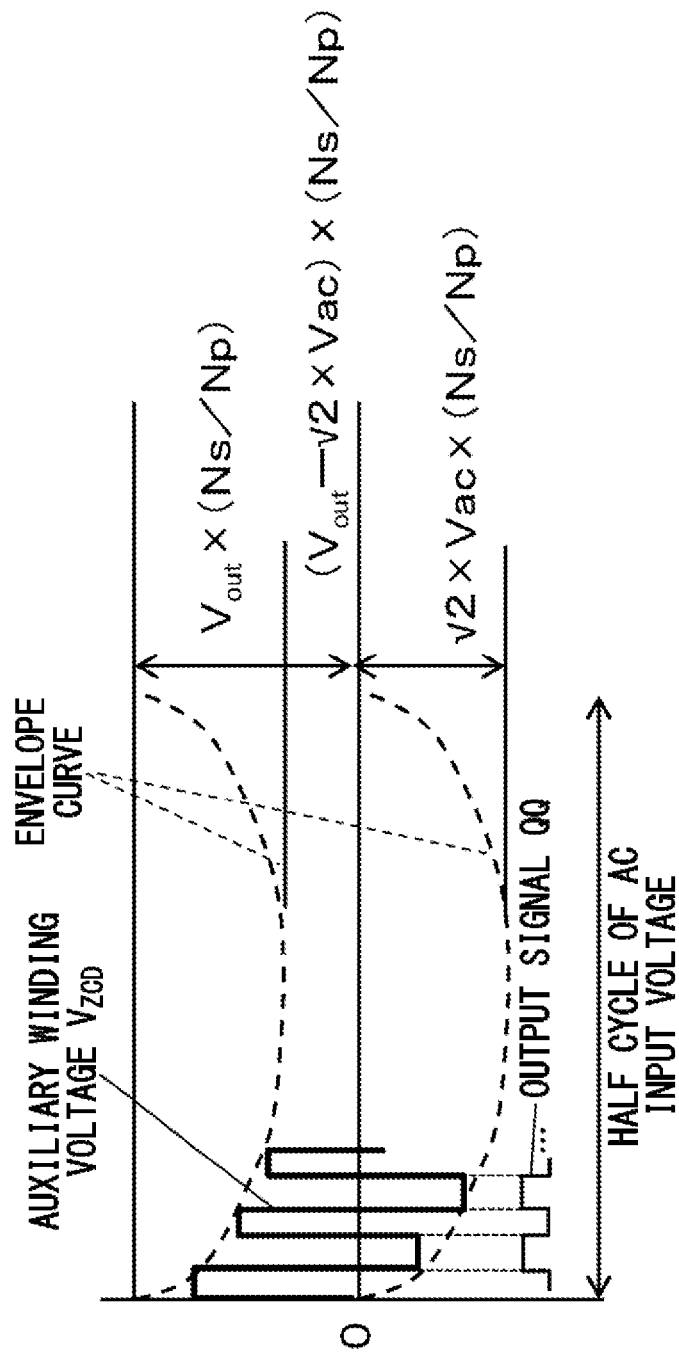
FIG. 2 illustrates a waveform of an auxiliary winding voltage $V_{ZCD}$.

FIG. 2 illustrates waveforms of an auxiliary winding voltage $V_{ZCD}$ and an output voltage QQ of a boost chopper 4. The "Vac" in the figure represents an AC input voltage. The auxiliary winding voltage $V_{ZCD}$ may change as illustrated with a bold line in the figure by switching of the switching element Q1.

Figure 3:
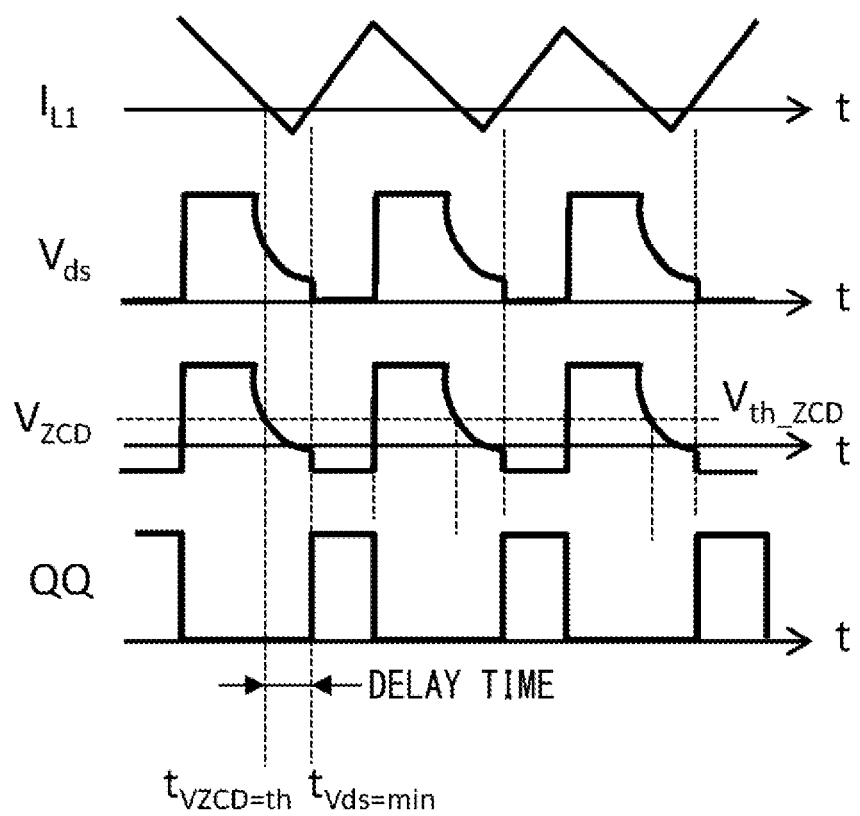
FIG. 3 illustrates an inductor current $I_{L1}$, a source-drain voltage Vds of a switching element Q1, the auxiliary winding voltage $V_{ZCD}$, and an output signal QQ of an RS flip-flop 655.

FIG. 3 illustrates an inductor current $I_{L1}$, a source-drain voltage Vds of a switching element Q1, an auxiliary winding voltage $V_{ZCD}$, and an output signal QQ of an RS flip-flop 655 that is a drive signal of a switching element Q1. FIG. 3 illustrates waveforms that are observed when an AC input voltage is not be switched. Waveforms when a bottom skip control is not performed are illustrated for simplification.

The power supply controller 6 aligns a turn-on timing to a timing ($t_{Vds=min}$) at which the inductor current $I_{L1}$ becomes zero and the source-drain voltage Vds of the switching element Q1 becomes local minimum by detecting that the auxiliary winding voltage $V_{ZCD}$ is less than zero crossing reference voltage $V_{th\_zcd}$ and turning on the switching element Q1 after a delay time from the detection timing ($t_{VZCD=th}$).

Figure 4:
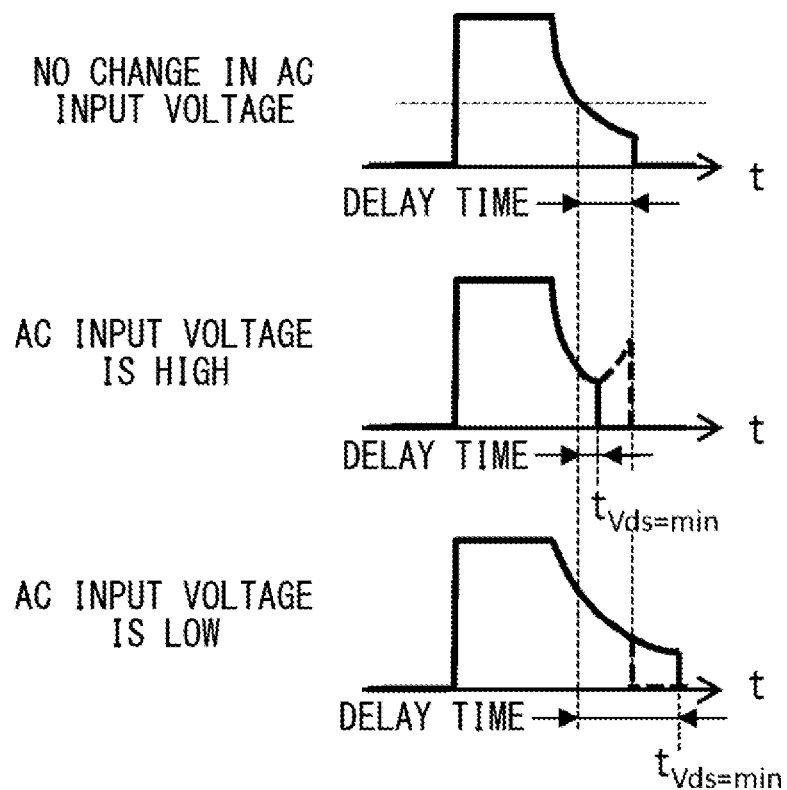
FIG. 4 illustrates the source-drain voltage Vds of the switching element Q1 when an AC input voltage is switched.

FIG. 4 illustrates a source-drain voltage Vds of a switching element Q1 when an AC input voltage is switched. A top graph in the figure illustrates a relationship between a source-drain voltage Vds and a delay time when the AC input voltage is not switched (as an example, when a 100V rated voltage is input). A center graph in the figure illustrates a relationship between a source-drain voltage Vds and a delay time when an AC input voltage becomes high (as an example, when switched to 200V rated voltage). A bottom graph in the figure illustrates a relationship between a source-drain voltage Vds and a delay time when an AC input voltage becomes low.

As illustrated with a thick dashed line in the figure, if a delay time is not adjusted when the AC input voltage is switched, a timing at which the source-drain voltage Vds of the switching element Q1 is not local minimum becomes a turn-on timing, and this leads to increased switching loss. On the other hand, the power supply controller 6 according to the present embodiment can reduce a switching loss because a turn-on timing is aligned to a timing at which the source-drain voltage Vds of the switching element Q1 becomes local minimum as a result of adjusting a delay time according to the auxiliary winding voltage $V_{ZCD}$ based on the inductor voltage during an ON period of the switching element Q1.

3. Delay Adjustment Unit 64

Figure 5:
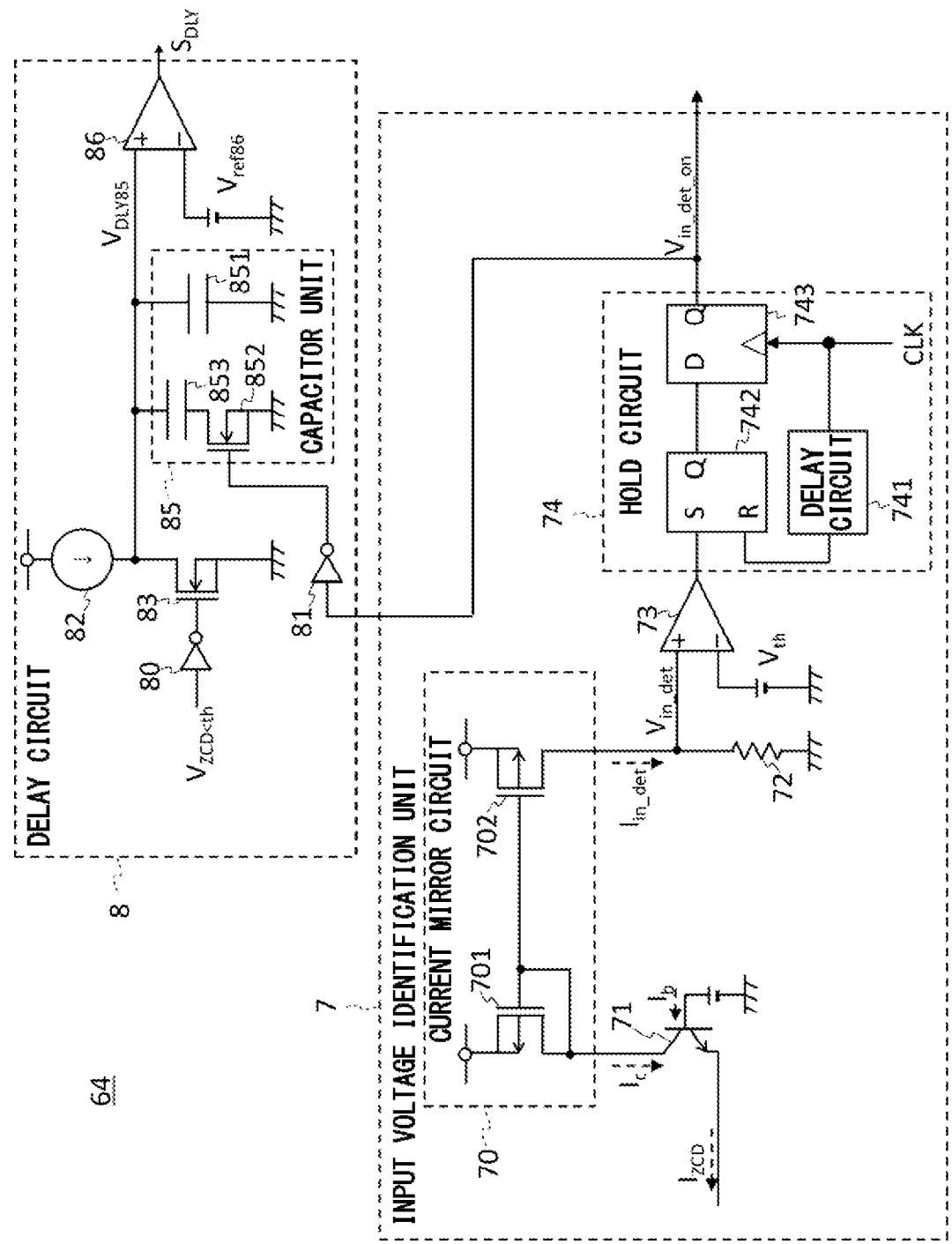
FIG. 5 illustrates a delay adjustment unit 64.

FIG. 5 illustrates a delay adjustment unit 64. The delay adjustment unit 64 according to the present embodiment sets a delay time smaller when determining that the current $I_{ZCD}$ based on the inductor voltage is a reference value or more during an ON period of the switching element Q1 than when the current $I_{ZCD}$ is less than a reference value. The delay adjustment unit 64 switches which of delay time setting values according to a plurality of types of rated voltages (in the present embodiment, as an example, two types that are 100V system and 200V system) is used as a delay time based on the current $I_{ZCD}$ during the ON period of the switching element Q1. The delay adjustment unit 64 includes an input voltage identification unit 7 and a delay circuit 8.

[3-1. Input Voltage Identification Unit 7]

The input voltage identification unit 7 identifies which of a plurality of types of rated voltages a voltage input to a boost chopper 4 is based on the current $I_{ZCD}$. For example, the input voltage identification unit 7 identifies which of two types of rated voltages the input voltage is depending on whether the current $I_{ZCD}$ becomes a reference value or more during the ON period of the switching element Q1. The input voltage identification unit 7 includes a current mirror circuit 70, an NPN bipolar transistor 71, a resistor 72, a comparator 73, and a hold circuit 74.

The current mirror circuit 70 outputs, from a transistor 702 of its output side, a current $I_{in\_det}$ according to an output current Ic of a transistor 701 of its input side. A current ratio between the current Ic and the current $I_{in\_det}$ may be N: 1.

The NPN bipolar transistor 71 is connected between the transistor 701 and the zero crossing detection terminal ZCD and has a collector terminal at the transistor 701 side and has an emitter terminal at the zero crossing detection terminal ZCD side. A base terminal of the bipolar transistor 71 receives a base current Ib of a fixed value.

When the switching element Q1 is on, a current flows from the zero crossing detection terminal ZCD to the auxiliary winding L2 side and a drawing current $I_{ZCD}$ according to the inductor voltage flows, and as a result, the same amount of current flows from the bipolar transistor 71 in the zero crossing detection terminal ZCD. That is, $I_{ZCD}$=Ic+Ib. Thus, a current at the output side of the current mirror circuit 70 is $I_{in\_det}$Ic/N=($I_{ZCD}$-Ib)/N when the switching element Q1 is on.

The resistor 72 detects a voltage according to the current $I_{in\_det}$ (also referred to as detection voltage $V_{in\_det}$) and is connected between the transistor 702 of the current mirror circuit 70 and a ground.

The comparator 73 identifies which of two types of rated voltages is a voltage input to the boost chopper 4. The comparator 73 has a non-inverting input terminal that is connected to a connection point between the transistor 702 and the resistor 72 and receives the detection voltage $V_{in\_det}$ ($V_{in\_det} \times R_{72}$) (where $R_{72}$ is resistance value of resistor 72) and has an inverting input terminal that receives a reference voltage $V_{th}$. The reference voltage $V_{th}$ is a voltage for identifying whether an input voltage is 100V system or 200V system and may be a voltage from a detection voltage $V_{in\_det}$ when the input voltage is 100V to a detection voltage $V_{in\_det}$ when the input voltage is 200V for example.

Accordingly, an output signal of the comparator 73 when the switching element Q1 is on becomes low level when the input voltage is 100V system and becomes high level when the input voltage is 200V system. When the switching element Q1 is off, the current $I_{ZCD}$, the current Ic, the current $I_{in\_det}$ and the like become small and the detection voltage $V_{in\_det}$ decreases, and thus, the output signal of the comparator 73 may become low level. The comparator 73 supplies an output signal to the hold circuit 74.

The hold circuit 74 holds the output signal of the comparator 73 when the switching element Q1 is on. The hold circuit 74 receives a clock signal CLK from an unillustrated clock circuit. A cycle of the clock signal CLK may be set to one cycle or half cycle of an AC power supply 2 and may be 20 ms, 10 ms and the like as an example. The clock circuit may include an input terminal of an output signal QQ from an RS flip-flop 655 to hold the output signal of the comparator 73 when the switching element Q1 is on. As a result, the clock circuit may output the clock signal CLK at a predetermined cycle at a timing at which the switching element Q1 becomes on, that is at a timing at which slightly delayed from an on timing of the output signal QQ. The hold circuit 74 includes a delay circuit 741, an RS flip-flop 742, and a D flip-flop 743.

The delay circuit 741 delays a reset timing of the RS flip-flop 742 than a timing at which the D flip-flop 743 captures a signal. The delay circuit 741 may delay the clock signal CLK and supplies a delayed signal to the RS flip-flop 742.

The RS flip-flop 742 has a set terminal receiving the output signal of the comparator 73 and a reset terminal receiving a clock signal delayed by the delay circuit 741. The RS flip-flop 742 supplies an output signal from its output terminal to the D flip-flop 743.

The D flip-flop 743 has an input terminal connected to the output terminal of the RS flip-flop 742. The D flip-flop 743 captures and holds an output signal value of the RS flip-flop 742 in synchronization with a clock timing of the clock signal CLK and outputs an output signal $V_{in\_det\_on}$ corresponding to a held value. The D flip-flop 743 supplies the output signal $V_{in\_det\_on}$ to a delay circuit 8 and a turn-on timer unit 9.

In the above described hold circuit 74, the RS flip-flop 742 is set during an ON period of the switching element Q1, and the D flip-flop 743 holds a high level signal and outputs the signal as the output signal $V_{in\_det\_on}$ when an input voltage becomes 200V system and the switching element Q1 is on. On the other hand, if an input voltage remains 100V system, the RS flip-flop 742 is not set during an ON period of the switching element Q1, and the D flip-flop 743 holds a low level signal and outputs the signal as the output signal $V_{in\_det\_on}$. A signal held by the D flip-flop 743 is updated every cycle of the clock signal CLK, and the RS flip-flop 742 is reset by the clock signal CLK delayed by the delay circuit 741 after updating the D flip-flop 743.

The output signal $V_{in\_det\_on}$ of the hold circuit 74 is based on the current $I_{ZCD}$ during an ON period of the switching element Q1, is supplied to the delay circuit 8, and is used for adjusting a delay time for turning on the switching element Q1 next. As a result, the delay time for turning on the switching element Q1 next may be adjusted based on the current $I_{ZCD}$ during an ON period immediately before a switching cycle of the switching element Q1. In this case, the clock circuit may set the cycle of the clock signal CLK to the timing slightly delayed from the on timing of the output signal QQ instead of one cycle or half cycle of the AC power supply 2.

[3-2. Delay Circuit 8]

The delay circuit 8 outputs a signal $S_{DLY}$ that becomes high level after a preset delay time from a time when the detection signal $V_{ZCD<th}$ from the detection unit 63 becomes high level and adjusts a delay time according to an identification result from an input voltage identification unit 7. The delay circuit 8 may switch which of two delay time setting values corresponding to rated voltages of 100V system and 200V system is used as a delay time according to a voltage identification signal $V_{in\_det}$. The delay circuit 8 includes NOT gates 80 and 81, a current source 82, an N-channel MOSFET 83, a capacitor unit 85, and a comparator 86.

The NOT gate 80 is connected between the detection unit 63 and a gate terminal of the N-channel MOSFET 83, and an inverted detection signal $V_{ZCD<th}$ from the detection unit 63 is supplied to the gate terminal of the N-channel MOSFET 83. The NOT gate 81 is connected between the input voltage identification unit 7 and the capacitor unit 85 and an inverted output signal $V_{in\_det\_on}$ from the input voltage identification unit 7 is supplied to the capacitor unit 85.

The current source 82 is connected in series to the capacitor unit 85 and supplies a constant current to the capacitor unit 85 to charge the capacitor unit 85.

The N-channel MOSFET 83 is connected in parallel with the capacitor unit 85 between the current source 82 and a ground. The N-channel MOSFET 83 is gate-driven by an inverted detection signal $V_{ZCD<th}$ supplied from the NOT gate 80. In an off state, the N-channel MOSFET 83 flows a current from the current source 82 to the capacitor unit 85 and charges the capacitor unit 85 and, alternatively in an on state, flows the current from the current source 82 and discharges the capacitor unit 85.

The capacitor unit 85 is charged when the N-channel MOSFET 83 is in the off state and generates a charge voltage $V_{DLY85}$ according to a charge amount. The capacitor unit 85 switches which of two types of delay time setting values is used as a delay time by switching its capacity based on the current $I_{ZCD}$ during an ON period of the switching element Q1. The capacitor unit 85 includes a capacitor 851 and a series circuit of an N-channel MOSFET 852 and the capacitor 853 connected in parallel to the capacitor 851.

The capacitor 851 is connected between the current source 82 and a ground and is charged by a current from the current source 82. The N-channel MOSFET 852 is connected between the capacitor 853 and a ground and is gate-driven by an inverted output signal $V_{in\_det\_on}$ supplied from the NOT gate 81. That is, the N-channel MOSFET 852 becomes on when the current $I_{ZCD}$ is less than a reference value (in the present embodiment, as an example, when detection voltage $V_{in\_det}$ is less than reference voltage $V_{th}$) and becomes off when the current $I_{ZCD}$ is a reference value or more. The capacitor 853 is connected in series with the N-channel MOSFET 852 between the current source 82 and a ground, and is charged by a current from the current source 82 when the N-channel MOSFET 852 is on and is not charged when the N-channel MOSFET 852 is off.

As a result, when the current $I_{ZCD}$ is less than a reference value, a capacity of the capacitor unit 85 increases and when the current $I_{ZCD}$ is a reference value or more, the capacity of the capacitor unit 85 decreases. The N-channel MOSFET 852 may be connected to the current source 82 side of the capacitor 853.

The comparator 86 has a non-inverting input terminal receiving the charge voltage $V_{DLY85}$ and has an inverting input terminal receiving a reference voltage $V_{ref86}$. The capacitor unit 85 starts to be charged when the detection signal $V_{ZCD<th}$ from the detection unit 63 becomes high level, and when the charge voltage $V_{DLY85}$ reaches the reference voltage $V_{ref86}$ after start charging of the capacitor unit 85, the output signal $S_{DLY}$ becomes high level and the switching element Q1 is turned on. Therefore, an elapsed time from when the capacitor unit 85 starts to be charged until when the charge voltage $V_{DLY85}$ reaches the reference voltage $V_{ref86}$ is a delay time for turning on the switching element Q1. An increase rate of the charge voltage $V_{DLY85}$ decreases and the delay time increases because as described above, when the current $I_{ZCD}$ is less than a reference value, a capacity of a capacitor unit 85 increases. Alternatively, the increase rate of the charge voltage $V_{DLY85}$ increases and the delay time decreases because when the current $I_{ZCD}$ is the reference value or more, the capacity of the capacitor unit 85 decreases.

The reference voltage $V_{ref86}$ may be set to the charge voltage $V_{DLY85}$ when the capacitor unit 85 is charged during an elapsed time from a timing ($t_{VZCD=th}$) at which the detection signal $V_{ZCD<th}$ becomes high level to a timing ($t_{Vds=min}$) at which the inductor current $I_{L1}$ becomes zero and the source-drain voltage Vds becomes local minimum, when an input voltage is 100V system and when an input voltage is 200V system. As a result, the output signal $S_{DLY}$ of the comparator 86 becomes high level and the switching element Q1 is turned on at a timing ($t_{Vds=min}$) at which the inductor current $I_{L1}$ becomes zero and the source-drain voltage Vds becomes local minimum.

By using the above described delay adjustment unit 64, a delay time becomes short when an input voltage is large because the delay time becomes shorter when the current $I_{ZCD}$ during an ON period is a reference value ore more than when the current $I_{ZCD}$ during the ON period is less than the reference value. Therefore, it is possible to turn on the switching element Q1 by resonance of a quasi-resonant circuit having an inductor L1 and input capacitance (CISS) of the switching element Q1, before the decreasing source-drain voltage Vds of the switching element Q1 increases after turning off of the switching element Q1. Accordingly, it is possible to surely reduce a switching loss by turning on the switching element Q1 by turning it on at a timing at which the source-drain voltage Vds surely becomes local minimum.

Further, which of delay time setting values according to a plurality of types of rated voltages is used is switched based on the current $I_{ZCD}$ during an ON period of the switching element Q1. Accordingly, even when the AC power supply 2 is switched, the switching element Q1 can be turned on at a timing ($t_{Vds=min}$) at which the inductor current $I_{L1}$ becomes zero and the source-drain voltage Vds becomes local minimum.

4. Turn-on Timer Unit 9

Figure 6:
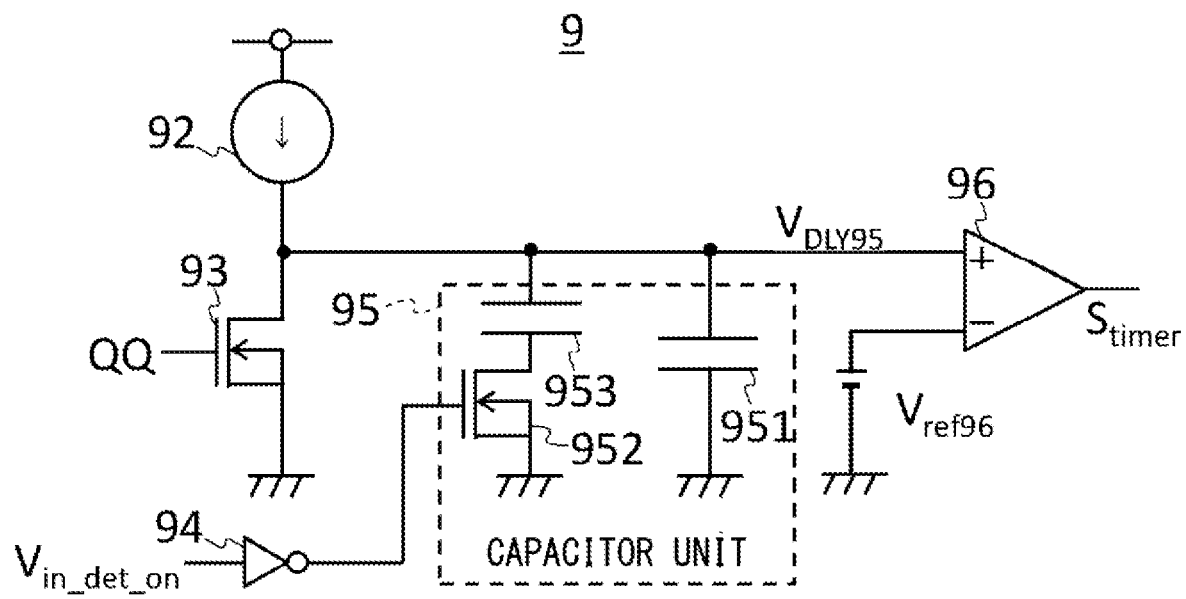
FIG. 6 illustrates a turn-on timer unit 9.

FIG. 6 illustrates a turn-on timer unit 9. The turn-on timer unit 9 outputs a signal $S_{timer}$ that becomes high level when the switching element Q1 does not change from an off state to an on state within a preset time. The turn-on timer unit 9 may turn on the switching element Q1 after a predetermined turn-on timer time from the start of an off period of the switching element Q1. As a result, the switching element Q1 is turned on even when, for example, the number of times an auxiliary winding voltage $V_{ZCD}$ changes from a zero crossing reference voltage $V_{th\_zcd}$ or more to less than the zero crossing reference voltage $V_{th\_zcd}$ does not reach a reference number of bottom skip control during an off period of the switching element Q1. In the present embodiment, although as an example, a start timing of the turn-on timer time is described as a timing at which the switching element Q1 is turned off, the timing may be a timing at which the auxiliary winding voltage $V_{ZCD}$ first changes from the zero crossing reference voltage $V_{th\_zcd}$ or more to less than zero crossing reference voltage $V_{th\_zcd}$. The delay adjustment unit 64 may adjust the turn-on timer time based on the current $I_{ZCD}$ during the ON period of the switching element Q1. As an example, the turn-on timer unit 9 may switch which of two setting values of turn-on timer times corresponding to rated voltages of 100V system and 200V system is used as the turn-on timer time according to a voltage identification signal $V_{in\_det}$ from the delay adjustment unit 64. The turn-on timer unit 9 includes a current source 92, an N-channel MOSFET 93, an NOT gate 94, a capacitor unit 95, and a comparator 96.

The current source 92 is connected in series to the capacitor unit 95 and charges the capacitor unit 95 by supplying a constant current to the capacitor unit 95.

The N-channel MOSFET 93 is connected in parallel with the capacitor unit 95 between the current source 92 and a ground. The N-channel MOSFET 93 is gate-driven by an output signal QQ from an RS flip-flop 655 of a switch control unit 65. As a result, when the output signal QQ is low level, that is, when the switching element Q1 is in an off state, the N-channel MOSFET 93 also becomes an off state, a current from the current source 92 is supplied to the capacitor unit 95, and the capacitor unit 95 is charged. When the output signal QQ is high level, that is, when the switching element Q1 is in an on state, the N-channel MOSFET 93 also becomes an on state, the current from the current source 92 is supplied to the capacitor unit 95, and the capacitor unit 95 is discharged.

The NOT gate 94 is connected between the input voltage identification unit 7 and the capacitor unit 95 and supplies an inverted output signal $V_{in\_det\_on}$ from the input voltage identification unit 7 to the capacitor unit 95.

The capacitor unit 95 is charged when the N-channel MOSFET 93 is in the off state and generates a charge voltage $V_{DLY95}$ according to a charge amount. The capacitor unit 95 switches which of two types setting values of turn-on timer times is used as a turn-on timer time by switching capacitances based on the current $I_{ZCD}$ during the ON period of the switching element Q1. The capacitor unit 95 includes a capacitor 951 and a series circuit of an N-channel MOSFET 952 and a capacitor 953 connected in parallel with the capacitor 951.

The capacitor 951 is connected between the current source 92 and a ground and is charged by a current from the current source 92. The N-channel MOSFET 952 is connected between the capacitor 953 and a ground and is gate-driven by an inverted output signal $V_{in\_det\_on}$ supplied from the NOT gate 94. That is, the N-channel MOSFET 952 becomes the on state when the current $I_{ZCD}$ is less than a reference value (in the present embodiment, as an example, when detection voltage $V_{in\_det}$ is less than reference voltage $V_{th}$) and becomes the off state when the current $I_{ZCD}$ is the reference value or more. The capacitor 953 is connected in series to the N-channel MOSFET 952 between the current source 92 and a ground, is charged by the current from the current source 92 when the N-channel MOSFET 952 is on and is not charged when the N-channel MOSFET 952 is off.

As a result, a capacitance of the capacitor unit 95 increases when the current $I_{ZCD}$ is less than a reference value and the capacitance of the capacitor unit 95 decreases when the current $I_{ZCD}$ is the reference value or more. The N-channel MOSFET 952 may be connected to the current source 92 side of the capacitor 953.

The comparator 96 has a non-inverting input terminal receiving the charge voltage $V_{DLY95}$ and an inverting input terminal receiving a reference voltage $V_{ref96}$. An output signal $S_{timer}$ becomes high level and the switching element Q1 is turned on when the charge voltage $V_{DLY95}$ reaches the reference voltage $V_{ref96}$ after start charging the capacitor unit 95. Therefore, an elapsed time from when the capacitor unit 95 starts to be charged until when the charge voltage $V_{DLY95}$ reaches the reference voltage $V_{ref96}$ is a turn-on timer time. As described above, when the current $I_{ZCD}$ is less than a reference value, the capacitance of the capacitor unit 95 increases, and thus, an increase rate of the charge voltage $V_{DLY95}$ decreases and a delay time increases. Alternatively, when the current $I_{ZCD}$ is the reference value or more, the capacitance of the capacitor unit 95 decreases, and thus, the increase rate of the charge voltage $V_{DLY95}$ increases and the delay time decreases.

The reference voltage $V_{ref96}$ may be set to the charge voltage $V_{DLY95}$ in a case that the capacitor unit 95 is charged during an elapsed time from when the switching element Q1 is turned off until when the inductor current $I_{L1}$ becomes zero a reference number of times in a bottom skip control (in the present embodiment, twice) and a source-drain voltage Vds of the switching element Q1 becomes local minimum when an input voltage is 100V system and when an input voltage is 200V system. As a result, even when the number of times when the auxiliary winding voltage $V_{ZCD}$ changes to less than a zero crossing reference voltage $V_{th\_zcd}$ does not reach twice and a high level signal $S_{DLY}$ is not output from a delay circuit 8, the output signal $S_{timer}$ of the comparator 96 becomes high level and the switching element Q1 is turned on at a timing ($t_{Vds=min}$) at which the inductor current $I_{L1}$ becomes zero and the source-drain voltage Vds becomes local minimum.

By using the above described turn-on timer unit 9, even when the number of times when the auxiliary winding voltage $V_{ZCD}$ changes from the zero crossing reference voltage $V_{th\_zcd}$ or more to less than the zero crossing reference voltage $V_{th\_zcd}$ does not reach a reference number in a bottom skip control, the switching element Q1 can be surely turned on at a timing ($t_{Vds=min}$) at which the inductor current $I_{L1}$ becomes zero and the source-drain voltage Vds of the switching element Q1 becomes local minimum.

5. Operation

Figure 7:
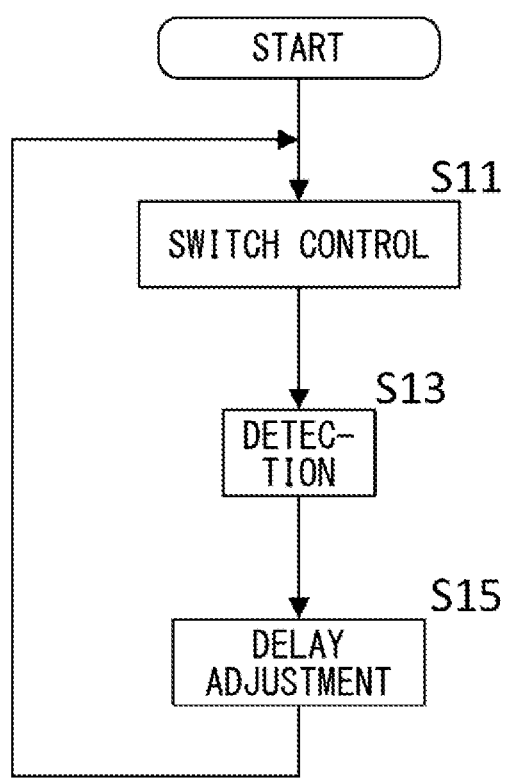
FIG. 7 illustrates a partial operation of a power supply controller 6.

FIG. 7 illustrates a partial operation of a power supply controller 6. The power supply controller 6 reduces a switching loss and improves energy efficiency by performing processes of steps S11 to S15.

In step S11, the switch control unit 65 controls an on/off of a switching element Q1 of a boost chopper 4. For example, the switch control unit 65 turns on the switching element Q1 in response to that at least one of an output signal $S_{DLY}$ from a delay adjustment unit 64 or an output signal $S_{timer}$ from a turn-on timer unit 9 becomes high level. Further, the switch control unit 65 controls the switching element Q1 such that the switching element Q1 is turned off during a time period when a ramp wave Ramp becomes larger than an error signal $V_{COMP}$.

In step S13, a detection unit 63 detects that an auxiliary winding voltage $V_{ZCD}$ of the boost chopper 4 becomes less than a zero crossing reference voltage $V_{th\_zcd}$. The detection unit 63 detects that the auxiliary winding voltage $V_{ZCD}$ becomes less than the zero crossing reference voltage $V_{th\_zcd}$ by a reference number in a bottom skip control and may set a level of a detection signal $V_{ZCD<th}$ to a high level.

In step S15, the delay adjustment unit 64 adjusts, according to a current $I_{ZCD}$ during an ON period of the switching element Q1, a delay time from when the detection unit 63 detects that the auxiliary winding voltage $V_{ZCD}$ becomes less than the zero crossing reference voltage $V_{th\_zcd}$ during an off period of the switching element Q1 until when the switching element Q1 is turned on at a process in step S11. In the present embodiment, the delay adjustment unit 64 may switch a delay time from when the detection signal $V_{ZCD<th}$ becomes high level until when the switching element Q1 is turned on based on the current $I_{ZCD}$. Further, the delay adjustment unit 64 may switch which of delay time setting values according to rated voltages of 100V system and 200V system is used as a delay time based on the current $I_{ZCD}$. As a result, the delay time is adjusted based on the current $I_{ZCD}$ and the output signal $S_{DLY}$ from the delay adjustment unit 64 becomes high level at a timing according to an adjusted delay time.

The delay adjustment unit 64 further adjusts a turn-on timer time based on the current $I_{ZCD}$ during an ON period of the switching element Q1. As a result, the turn-on timer time is adjusted based on the current $I_{ZCD}$ and even when the number of times when the auxiliary winding voltage $V_{ZCD}$ changes from the zero crossing reference voltage $V_{th\_zcd}$ or more to less than the zero crossing reference voltage $V_{th\_zcd}$ during an off period of the switching element Q1 does not reach a reference number of a bottom skip control, the output signal $S_{timer}$ from the turn-on timer unit 9 becomes high level. Thereafter, the power supply controller 6 repeats processes of step S11 to S15.

6. Modified Example

Figure 8:
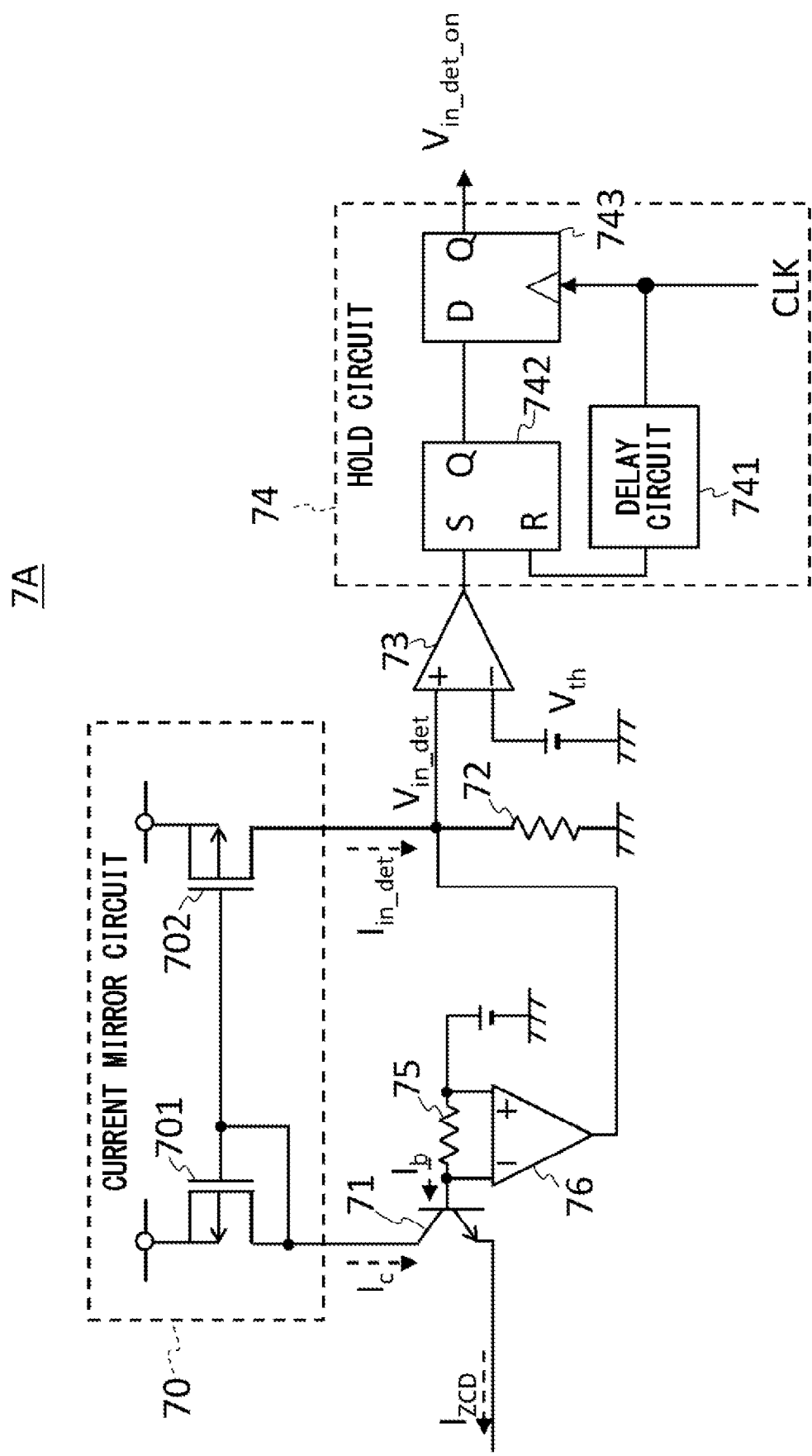
FIG. 8 illustrates an input voltage identification unit 7A according to a modified example.

FIG. 8 illustrates an input voltage identification unit 7A according to a modified example. The input voltage identification unit 7A further includes a resistor 75 and a transconductance amplifier 76. The resistor 75 is connected to a base terminal of a bipolar transistor 71 and converts a base current Ib into a voltage. A non-inverting input terminal and an inverting input terminal are respectively connected to both ends of the resistor 75 and the transconductance amplifier 76 outputs to a connection point between a transistor 702 and a resistor 72, a current obtained by multiplying a transconductance (gm) by voltages generated at both ends of the resistor 75 (=Ib×$R_{75}$×gm) (however, $R_{75}$ is resistance value of resistor 75.

By using the above described input voltage identification unit 7A, a detection voltage that is detected by the resistor 72 and is input to the non-inverting input terminal of a comparator 73 is $V_{in\_det}=(I_{in\_det}+Ib \times R_{75} \times gm) \times R_{72}$. Therefore, the input voltage identification unit 7A can accurately identify an input voltage because the input voltage can be identified by also considering the base current Ib unlike the input voltage identification unit 7 illustrated in FIG. 4. A resistance value $R_{75}$ of the resistor 75, the transconductance (gm) of the transconductance amplifier 76, and a current ratio N of a current mirror circuit 70 may be set to satisfy $R_{75} \times gm=1/N$. In this case, a detection voltage $V_{in\_det}=I_{ZCD} \times R_{72}/N$.

Figure 9:
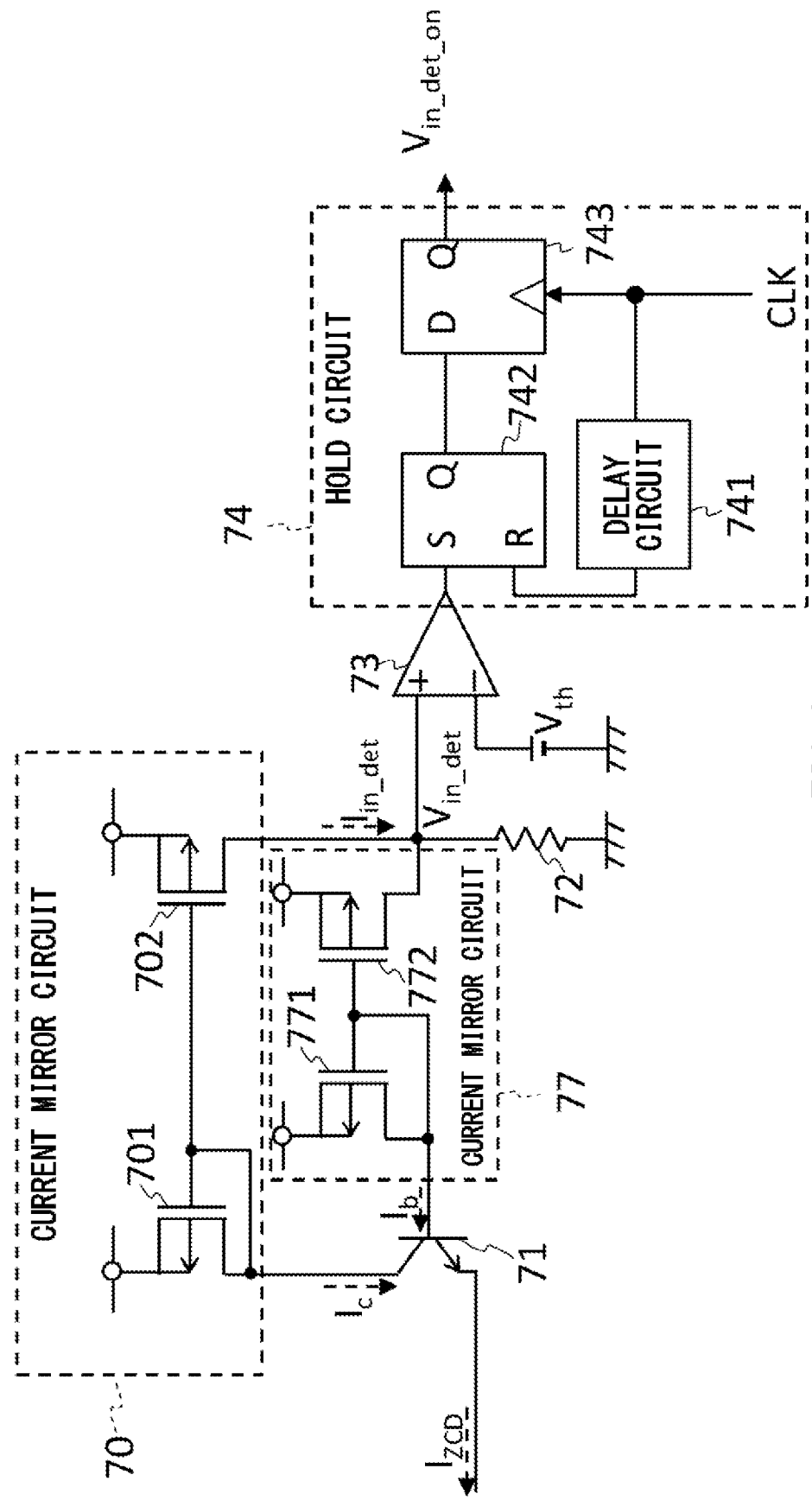
FIG. 9 illustrates an input voltage identification unit 7B according to another modified example.

FIG. 9 illustrates an input voltage identification unit 7B according to another modified example. The input voltage identification unit 7B further includes a current mirror circuit 77. The current mirror circuit 77 includes an input side transistor 771 connected to the base terminal of the bipolar transistor 71 and an output side transistor 772 connected to a connection point between the transistor 702 and the resistor 72. A current ratio between the input side and the output side in the current mirror circuit 77 may be N:1.

By using the above described input voltage identification unit 7B, a detection voltage that is detected by the resistor 72 and is input to a non-inverting input terminal of a comparator 73 is $V_{in\_det}=(Ic/N+Ib/N) \times R_{72}=I_{ZCD} \times R_{72}/N \cdot s$. Therefore, an input voltage can be identified accurately because the input voltage can be identified by also considering the base current Ib unlike the input voltage identification unit 7 illustrated in FIG. 4.

7. Other Modified Examples

In the above embodiments, an auxiliary winding L2 is wound in a reverse polarity relative to the inductor L1 so that the auxiliary winding L2 has and an input voltage identification unit 7 indirectly detects, from a current $I_{ZCD}$, an auxiliary winding voltage $V_{ZCD}$ obtained by multiplying Ns/Np by an input voltage appearing in a main winding L1 during an ON period of a switching element Q1. Specifically, the input voltage identification unit 7 converts the current $I_{ZCD}$ flowing out from the power supply controller 6 into a voltage and identifies an AC input voltage. However, a voltage obtained by multiplying a turn ratio (Ns/Np) by an input-output voltage difference appears in the auxiliary winding L2 during an off period of the switching element Q1, and thus, the input voltage identification unit 7 may convert a current flowing in the power supply controller 6 into a voltage based on the voltage and identify an AC input voltage. That is, the input voltage identification unit 7 may convert the current flowing in the power supply controller 6 during the off period of the switching element Q1 into the voltage and identify the AC input voltage. In this case, a delay adjustment unit 64 may adjust a delay time according to a second value based on an inductor voltage during the off period of the switching element Q1 (current flowing in power supply controller 6) and may further adjust a turn-on timer time based on the second value.

Although it has been described that a power supply device 1 contains an AC power supply 2 and a full-wave rectifying circuit 3, at least one of the AC power supply 2 or the full-wave rectifying circuit 3 may be externally connected to the power supply device 1 instead of being provided in the power supply device 1.

Although it has been described that the power supply controller 6 includes a comparison voltage generation unit 61 and a positive voltage clamp circuit 62, the power supply controller 6 may not include at least one of them.

Although it has been described that the power supply controller 6 identifies which of a plurality of types of rated voltages is an AC input voltage and adjusts a delay time, the delay time may be adjusted according to a change in a current $I_{ZCD}$ in association with a change in the AC input voltage during the ON period of the switching element Q1. For example, the power supply controller 6 may detect the change in the AC input voltage within a range of one rated voltage in association with the change in the current $I_{ZCD}$ and adjust the delay time. When the AC power supply 2 has a rated voltage of 100V system, as an example, the power supply controller 6 may detect whether the AC input voltage is less than 100V, whether the AC input voltage is from 100V to 105V, whether the AC input voltage is from 105V to 110V, and whether the AC input voltage is 110V or more and adjust the delay time. In this case, when the AC input voltage changes within an allowable range, the switching element Q1 can be turned on at a timing at which the inductor current $I_{L1}$ becomes zero and the source-drain voltage Vds of the switching element Q1 becomes local minimum.

Although it has been described that a delay circuit 8 adjusts the delay time by switching the number of capacitors that can be charged within a capacitor unit 85, the delay time may be adjusted by switching a reference voltage $V_{ref86}$ of a comparator 86. Similarly, although it has been described that a turn-on timer unit 9 adjusts a turn-on timer time by switching the number of capacitors that can be charged within a capacitor unit 95, the turn-on timer time may be adjusted by switching a reference voltage $V_{ref96}$ of a comparator 96.

Further, although it has been described that the power supply controller 6 performs a bottom skip control, the power supply controller 6 may not perform the bottom skip control. In this case, a detection unit 63 may output a detection signal $V_{ZCD<th}$ that becomes high level in response to that an auxiliary winding voltage $V_{ZCD}$ becomes less than a zero crossing reference voltage $V_{th\_zcd}$.

Although it has been described that a first value based on an inductor voltage corresponds to an auxiliary winding voltage $V_{ZCD}$ and a second value based on an inductor voltage corresponds to a current $I_{ZCD}$, the first and second values may be the inductor voltages or other values based on the inductor voltage. For example, the first value may correspond to the current $I_{ZCD}$ and the second value may correspond to the auxiliary winding voltage $V_{ZCD}$. The first and second values may be the same value.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: power supply device, 2: AC power supply, 3: full-wave rectifying circuit, 4: boost chopper, 5: voltage error detection compensation circuit, 6: power supply controller, 7: input voltage identification unit, 7A: input voltage identification unit, 7B: input voltage identification unit, 8: delay circuit, 9: turn-on timer unit, 50: RC phase compensation circuit, C50: capacitor, R50: resistor, C51: capacitor, 61: comparison voltage generation unit, 61a: error amplifier, 62: positive voltage clamp circuit, 62a: Zener diode, 63: detection unit, 64: delay adjustment unit, 65: switch control unit, 70: current mirror circuit, 71: bipolar transistor, 72: resistor, 73: comparator, 74: hold circuit, 75: resistor, 76: transconductance amplifier, 77: current mirror circuit, 80: NOT gate, 81: NOT gate, 82: current source, 83: N-channel MOSFET, 85: capacitor unit, 86: comparator, 92: current source, 93: N-channel MOSFET, 94: NOT gate, 95: capacitor unit, 96: comparator, 652: OR gate, 653: oscillator, 654: pulse width modulation comparator, 655: RS flip-flop, 701: transistor, 702: transistor, 741: delay circuit, 742: RS flip-flop, 743: D flip-flop, 771: transistor, 772: transistor, 851: capacitor, 852: N-channel MOSFET, 853: capacitor, 951: capacitor, 952: N-channel MOSFET, 953: capacitor, C1: output capacitor, D1: diode, L1: inductor, L2: auxiliary winding, Q1: switching element, R1: voltage dividing resistor, R2: voltage dividing resistor, R4: detection resistor, T: transformer

What is claimed is:

1. A power supply controller comprising:
a switch control unit that controls an on/off of a switching element of a boost chopper;
a detection unit that detects that a first value based on an inductor voltage of an inductor of the boost chopper is less than a threshold; and
a delay adjustment unit that adjusts a delay time from when the detection unit detects that the first value is less than the threshold until when the switch control unit turns on the switching element according to a second value based on the inductor voltage, wherein
the delay adjustment unit sets the delay time smaller when the second value is the reference value or more, than in a case that the second value is less than the reference value.

2. The power supply controller according to claim 1, wherein
the delay adjustment unit determines whether the second value is a reference value or more during an ON period of the switching element.

3. The power supply controller according to claim 1, wherein
the switch control unit turns on the switching element in response to that number of times the first value changes from the threshold or more to less than the threshold reaches a predetermined number of times; and
the delay adjustment unit adjusts the delay time from when the number of times the first value changes from the threshold or more to less than the threshold reaches the predetermined number of times until when the switch control unit turns on the switching element.

4. The power supply controller according to claim 3, wherein
the switch control unit includes a turn-on timer unit that turns on the switching element after a predetermined turn-on timer time; and
the delay adjustment unit further adjusts the turn-on timer time based on the second value.

5. The power supply controller according to claim 1, wherein
the boost chopper includes a transformer having a main winding functioning as the inductor and an auxiliary winding; and
the detection unit uses an auxiliary winding voltage as the first value.

6. The power supply controller according to claim 5, wherein
the delay adjustment unit uses a current according to the auxiliary winding voltage as a second value.

7. The power supply controller according to claim 1, wherein
the delay adjustment unit switches which of delay time setting values according to a plurality of types of rated voltages is used as the delay time based on the second value during an ON period of the switching element.

8. The power supply controller according to claim 1, wherein
the delay adjustment unit adjusts the delay time according to a change in the second value in association with a change in an AC input voltage from a power source that supplies power to the boost chopper.

9. The power supply controller according to claim 1, wherein
the delay adjustment unit adjusts the delay time according to the second value based on the inductor voltage during an off period of the switching element.

10. A power supply controller comprising:
a switch control unit that controls an on/off of a switching element of a boost chopper;
a detection unit that detects that a first value based on an inductor voltage of an inductor of the boost chopper is less than a threshold; and a delay adjustment unit that adjusts a delay time from when the detection unit detects that the first value is less than the threshold until when the switch control unit turns on the switching element according to a second value based on the inductor voltage, wherein the switch control unit turns on the switching element in response to that number of times the first value changes from the threshold or more to less than the threshold reaches a predetermined number of times; and the delay adjustment unit adjusts the delay time from when the number of times the first value changes from the threshold or more to less than the threshold reaches the predetermined number of times until when the switch control unit turns on the switching element.

11. The power supply controller according to claim 1, wherein the delay adjustment unit determines whether the second value is a reference value or more during an ON period of the switching element; and sets the delay time smaller in a case of determining that the second value is the reference value or more than in a case that the second value is less than the reference value.

12. The power supply controller according to claim 10, wherein the switch control unit includes a turn-on timer unit that turns on the switching element after a predetermined turn-on timer time; and the delay adjustment unit further adjusts the turn-on timer time based on the second value.

13. The power supply controller according to claim 10, wherein the boost chopper includes a transformer having a main winding functioning as the inductor and an auxiliary winding; and the detection unit uses an auxiliary winding voltage as the first value.

14. The power supply controller according to claim 13, wherein the delay adjustment unit uses a current according to the auxiliary winding voltage as a second value.

15. The power supply controller according to claim 10, wherein the delay adjustment unit switches which of delay time setting values according to a plurality of types of rated voltages is used as the delay time based on the second value during an ON period of the switching element.

16. The power supply controller according to claim 10, wherein the delay adjustment unit adjusts the delay time according to a change in the second value in association with a change in an AC input voltage from a power source that supplies power to the boost chopper.

17. The power supply controller according to claim 10, wherein the delay adjustment unit adjusts the delay time according to the second value based on the inductor voltage during an off period of the switching element.

\* \* \* \* \*